(12) United States Patent
Yun

(10) Patent No.: US 10,156,955 B2
(45) Date of Patent: Dec. 18, 2018

(54) METHOD AND SERVER FOR STORING, ENCODING AND UPLOADING VIDEO OR OBJECT CAPTURED FROM A WEBPAGE USING A TOOLBAR

(71) Applicant: NHN Corporation, Seongnam-si (KR)

(72) Inventor: Chan Ho Yun, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 442 days.

(21) Appl. No.: 13/941,901

(22) Filed: Jul. 15, 2013

(65) Prior Publication Data
US 2014/0026050 A1    Jan. 23, 2014

(30) Foreign Application Priority Data

Jul. 17, 2012  (KR) .................. 10-2012-0077874
Jul. 17, 2012  (KR) .................. 10-2012-0077877

(51) Int. Cl.
| | | |
|---|---|---|
| G06F 17/30 | (2006.01) | |
| H04N 21/2743 | (2011.01) | |
| G06F 3/0481 | (2013.01) | |
| H04N 21/2747 | (2011.01) | |

(52) U.S. Cl.
CPC ...... *G06F 3/0481* (2013.01); *G06F 17/30823* (2013.01); *G06F 17/30855* (2013.01); *H04N 21/2743* (2013.01); *H04N 21/2747* (2013.01)

(58) Field of Classification Search
CPC ............... G06F 17/30; G06F 17/30884; G06F 17/3089; G06F 3/0486; G06F 3/0481; G06F 17/30823; G06F 17/30855; H04L 67/06; G11B 27/034; H04N 21/2743; H04N 21/2747

USPC .................. 715/234, 739, 769, 811; 709/217
See application file for complete search history.

(56) References Cited

U.S. PATENT DOCUMENTS

| | | | | |
|---|---|---|---|---|
| 8,352,576 | B2 * | 1/2013 | Sparks ........................ | 709/219 |
| 8,666,961 | B1 * | 3/2014 | Qureshi et al. ............... | 707/705 |
| 2002/0087592 | A1 * | 7/2002 | Ghani ..................... | G06Q 10/10 |
| | | | | 715/239 |
| 2003/0184582 | A1 * | 10/2003 | Cohen .......................... | 345/736 |
| 2004/0186775 | A1 * | 9/2004 | Margiloff et al. .............. | 705/14 |

(Continued)

FOREIGN PATENT DOCUMENTS

| | | |
|---|---|---|
| KR | 2002-0080270 A | 10/2002 |
| KR | 2009-0056506 A | 6/2009 |

OTHER PUBLICATIONS

Arnote, "Firefox Add-on: Video DownloadHelper", The PCLinuxOS magazine, vol. 51, Apr. 2011, found at http://pclosmag.com/html/Issues/201104/page17.html, as evidenced by Archive.org, Apr. 12, 2011, pp. 1-4.*

(Continued)

*Primary Examiner* — Andrew L Tank
(74) *Attorney, Agent, or Firm* — Greer Burns & Crain Ltd.

(57) ABSTRACT

A method and cloud server for capturing and encoding a video from a website through a toolbar are disclosed. The method of capturing the video through the toolbar may include retrieving and selecting video from the website and capturing the selected video. The method of uploading the object on the webpage through the toolbar may include analyzing object information about the object on the webpage through the toolbar, selecting and transferring the object to an upload area through the toolbar using an account.

9 Claims, 18 Drawing Sheets

(56) References Cited

U.S. PATENT DOCUMENTS

| | | | |
|---|---|---|---|
| 2006/0224997 A1* | 10/2006 | Wong et al. | 715/838 |
| 2008/0013916 A1* | 1/2008 | Sharpe | G11B 27/034 386/278 |
| 2008/0195698 A1* | 8/2008 | Stefanovic | H04N 7/17327 709/203 |
| 2008/0195712 A1* | 8/2008 | Lin et al. | 709/206 |
| 2008/0216139 A1* | 9/2008 | Liwerant | G06Q 30/02 725/113 |
| 2009/0049122 A1* | 2/2009 | Wayne et al. | 709/203 |
| 2009/0313304 A1* | 12/2009 | Goodger et al. | 707/104.1 |
| 2010/0037177 A1* | 2/2010 | Golsorkhi | 715/818 |
| 2010/0205628 A1* | 8/2010 | Davis et al. | 725/25 |
| 2010/0269056 A1* | 10/2010 | Fujita et al. | 715/760 |
| 2011/0055721 A1* | 3/2011 | Jain et al. | 715/748 |
| 2012/0272278 A1* | 10/2012 | Bedi | 725/105 |
| 2012/0290968 A1* | 11/2012 | Cecora | 715/780 |

OTHER PUBLICATIONS

NetVideoHunter, http://netvideohunter.com/pages/how-to-use, as evidenced by Archive.org, Jun. 26, 2011, pp. 1-3.*

Japanese Office Action dated Jun. 3, 2014 by the Japanese Patent Office corresponding to Japanese patent application No. 2013-137825.

Web browser Firefox, Enhanced with plug-ins and add-ons taking 120% advantage of classic soft, Nikkei Linux, Japan, Nikkei BP, May 8, 2010, vol. 12, No. 6, p. 57-60.

DownloaderHelper-Media download Firefox extension, Internet Archive, Jan. 1, 2012, URL https://web.archive.org/web/20120101081715/http://www.downloadhelper.net/mp3tunes.php.

Korean Office Action dated Jan. 18, 2017 by the Korean Patent Office corresponding to Korean patent application No. 10-2012-0077874.

* cited by examiner

METHOD AND SERVER FOR STORING, ENCODING AND UPLOADING VIDEO OR OBJECT CAPTURED FROM A WEBPAGE USING A TOOLBAR

CROSS-REFERENCE TO RELATED APPLICATIONS

This application claims priority from and the benefit under 35 U.S.C. § 119(a) of Korean Patent Application No. 10-2012-0077877 and of Korean Patent Application No. 10-2012-0077874, both filed the Korean Intellectual Property Office on Jul. 17, 2012, the entire disclosures of which are incorporated herein by reference for all purposes as if fully set forth herein.

BACKGROUND

Field

Exemplary embodiments of the present invention relate to a method of capturing a video played back on a website through a toolbar in a computer, and more particularly to a method and a server for encoding or storing the captured video using a cloud server. Exemplary embodiments of the present invention also relate to a method of uploading an object on a webpage, and more particularly to a method and a server for detecting and uploading an object on a webpage in an electronic device with a toolbar installed.

Discussion of the Background

A method of capturing content on a computer screen includes outputting a still image of an entire screen, a screenshot, in a bitmap file format, dumping a screen by using an internal request to a display system, and a screen capture for storing a screen for a predetermined time in a video file format.

A screen capture that includes a computer screen capture including a video on a website generates a large sized video file.

To overcome such an issue, conventional technologies are used, wherein encoding is performed for editing or converting a video file suitably for varied usage, for example, converting a Digital Versatile Disc (DVD) movie into a Personal Computer (PC) video or converting a TeleVision (TV) broadcast into a video on a PC in real time or into an Internet streaming file for use in an Internet cinema or an Internet broadcasting station through a TV card. In this case, however, an encoding program, independent of a video capture program, is installed.

Thus, there is a demand for a technology for capturing and encoding a video from a website through a single toolbar, for example, a toolbar button. There is also demand for providing a cloud service enabling the video to be stored on a cloud server and played back in an integrated manner.

To obtain information via the Internet through an electronic device, a user needs to access a website. According to related art, the user can connect to the webpage by inputting a webpage address, for example, a Universal Resource Locator (URL), to an electronic device.

When the user wishes to save an object on the webpage, such as, an image, a video, and a music file, the user selects the object using a pointing device, for example, a mouse, and saves the object directly to a desktop PC. However, to upload the object to a cloud service, the user faces an inconvenience of installing and running a program providing the cloud service and implementing a login process.

According to other related art, a content provider provides a toolbar service to provide an ease of access to information for users. A toolbar is a widget which is activated in an area of a web browser and includes a keyword input box and option buttons, and provides users with a convenience of surfing the Internet through the web browser.

However, a conventional toolbar does not provide a service for uploading an object on a webpage directly to a cloud server. Therefore, there is a demand for a technology that is convenient and permits user manipulation for uploading an object, such as, an image, a video, and an attached file, in a web browser including the toolbar.

SUMMARY

Exemplary embodiments of the present invention provide a method and a server for capturing a video on a website in an integrated manner through a toolbar and storing the video in a cloud server or mobile device.

Exemplary embodiments of the present invention provide a method and a server for capturing and encoding a video on a website in an integrated manner through a toolbar.

Exemplary embodiments of the present invention provide a method and a server for managing, in an integrated manner, a process for capturing a video on a website via logging in with an account through a toolbar, encoding the video, storing the video in a cloud server, and playing back the video.

Exemplary embodiments of the present invention provide a method and a server for manipulating video capture through a toolbar in an Admin Tool when there is a change in the specifications of a website or per a request of a web content copyright holder.

Exemplary embodiments of the present invention provide a method and a server for uploading an object included in a webpage directly to an object management server providing a cloud service through a toolbar.

Exemplary embodiments of the present invention provide a method and a server for uploading an object on a webpage directly to an object management server by performing a drag and drop operation through a toolbar.

Exemplary embodiments of the present invention provide a method and a server for uploading an object on a webpage via logging in to an account, for example, created in advance, through a toolbar.

Exemplary embodiments of the present invention provide a method and a server for processing an object uploaded to a server through a toolbar.

Additional features of the invention will be set forth in the description which follows, and in part will be apparent from the description, or may be learned by practice of the invention.

An exemplary embodiment of the present invention discloses a computer-implemented method of capturing a video using a toolbar installed on the computer, the method including: retrieving, with the computer, a video from a website; selecting, with the toolbar, the video based on a manipulation instruction; capturing the selected video; and storing, with the computer, the video on a cloud server or a mobile device.

An exemplary embodiment of the present invention discloses a cloud server for capturing a video, the cloud server including: a communication unit; a processor; and a computer storage medium including instructions to enable the processor to perform operations when the instructions are executed by the processor. The operations include: performing, with the cloud server, authentication based on a request for logging in to an account; capturing a video from a website based on a manipulation instruction through a toolbar; receiving an encoding instruction for the video; encoding the video based on the encoding instruction; and storing the encoded video.

An exemplary embodiment of the present invention discloses a computer-implemented method of uploading an object on a webpage through a toolbar installed on the computer, the method including: connecting, with the computer, to the webpage; analyzing, through the toolbar, object information about the object on the webpage; selecting and transferring, through the toolbar, the object to an upload area; verifying that logging in to an object management server is enabled through the toolbar; and uploading, with the computer, the object transferred to the upload area, along with the object information, to the server through the toolbar when logging in is enabled.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Figure 1:
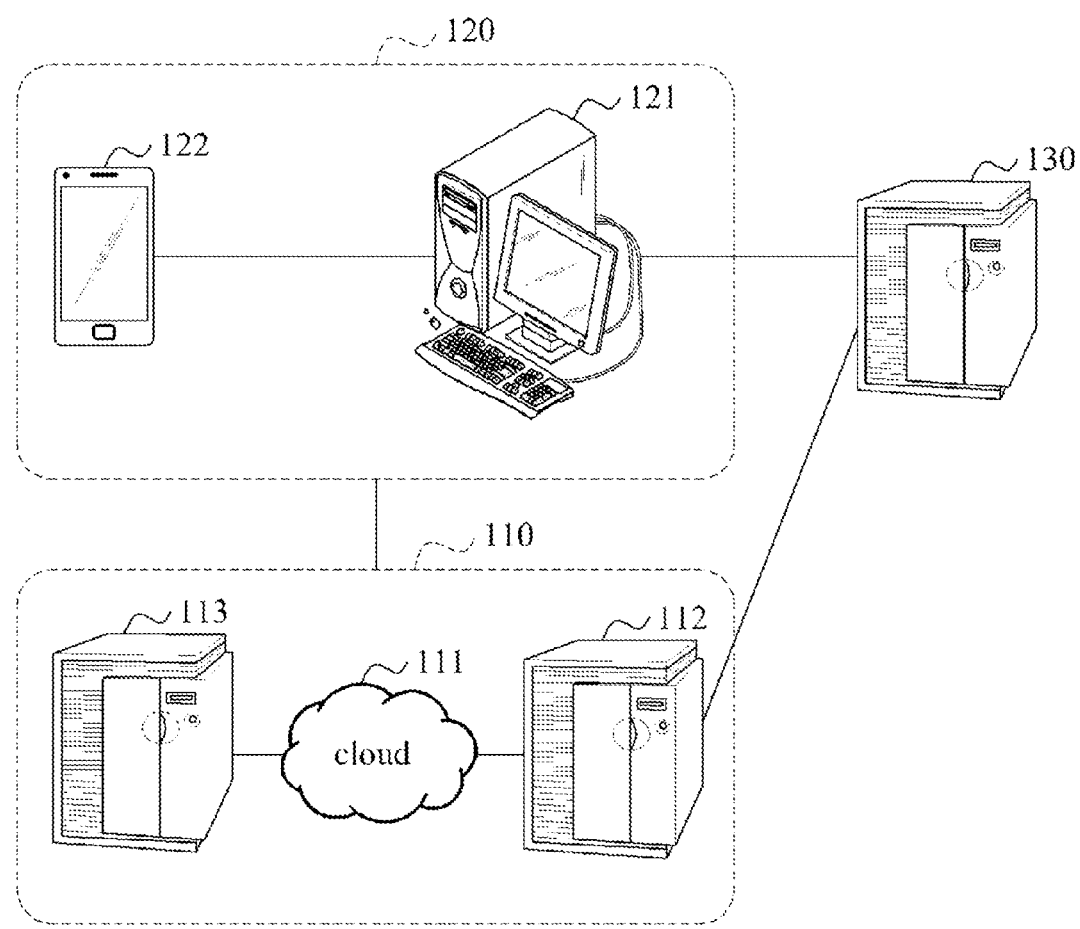
FIG. 1 schematically illustrates relationships between a user personal computer (PC), a mobile device, a cloud server, an Admin Tool, a distribution server, and a video website server according to exemplary embodiments of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. Various changes, modifications, and equivalents of the systems, apparatuses, and/or methods described herein will likely suggest themselves to those of ordinary skill in the art. Elements, features, and structures are denoted by the same reference numerals throughout the drawings and the detailed description, and the size and proportions of some elements may be exaggerated in the drawings for clarity and convenience.

Additional features of the invention will be set forth in the description which follows, and in part will be apparent from the description, or may be learned by practice of the invention.

FIG. 1 schematically illustrates relations between a personal computer (PC) 121, a mobile device 122, a cloud server 111, an Admin Tool 112, a distribution server 113, and a video website server 130 according to exemplary embodiments of the present invention.

The PC 121 may refer to any electronic communication device that allows a browser to connect to a website and a toolbar to be installed. The PC 121 may capture and store a video on a website through the toolbar, or playback and verify a video stored on the cloud server 111 via logging in to an account. For example, the PC 121 may include a desktop computer, a laptop computer, and the like.

The mobile device 122 may be connected to the PC 121 to store the video captured from the website through the toolbar directly, or transmit a video stored on the mobile device 122 to the PC 121 or the cloud server 111 to store therein. For example, the mobile device 122 may include a cellular phone, a smartphone, a tablet PC, and the like.

Here, a connection between the mobile device 122 and the PC 121 may be realized by any form of wired or wireless communication technology, for example, a wireless local area network technology, such as, a wireless-fidelity (WI-FI) connection and a BLUETOOTH device.

The cloud server 111 includes a server to encode and store the video captured from the website. The cloud server 111 may be a group of a plurality of servers. The servers can provide parallel computing capabilities. To enable a series of processes of capturing, encoding, storing, playing back, and verifying a video to be carried out on the cloud server 111, a user authentication process used by a user of the PC 121 or the mobile device 122 to log into the cloud server 111 using an account may be needed. The cloud server 111 may include the Admin Tool 112.

The Admin Tool 112 may manipulate the toolbar upon request from a copyright holder of the video or a change in specifications of the website. Here, the Admin Tool 112 may be included in the cloud server 111 but is not limited to such a configuration. In exemplary embodiments, the Admin Tool 112 may be configured as a separate unit from the cloud server 111. In exemplary embodiments, when a person having a right to the video, for example, the copyright holder of the video, makes a request for blocking the video, the video may be blocked by inputting an address of the website in the Admin Tool 112 without a program source being changed. Likewise, when there is a change in the specifications of the website, a changed specification is input, thereby applying the change. Here, the specifications of the website may include a website address of the video. In exemplary embodiments, the Admin Tool can be implemented as software. In exemplary embodiments, the Admin Tool can be deployed on a cloud server.

The distribution server 113 includes a server for distributing a toolbar program according to exemplary embodiments and may include a storage medium for storing the toolbar and a communication unit for distributing the toolbar stored in the storage medium.

The video website server 130 includes a server for providing a website accessible via the PC through a universal resource locator (URL) address. Here, the website may include a video.

Figure 2:
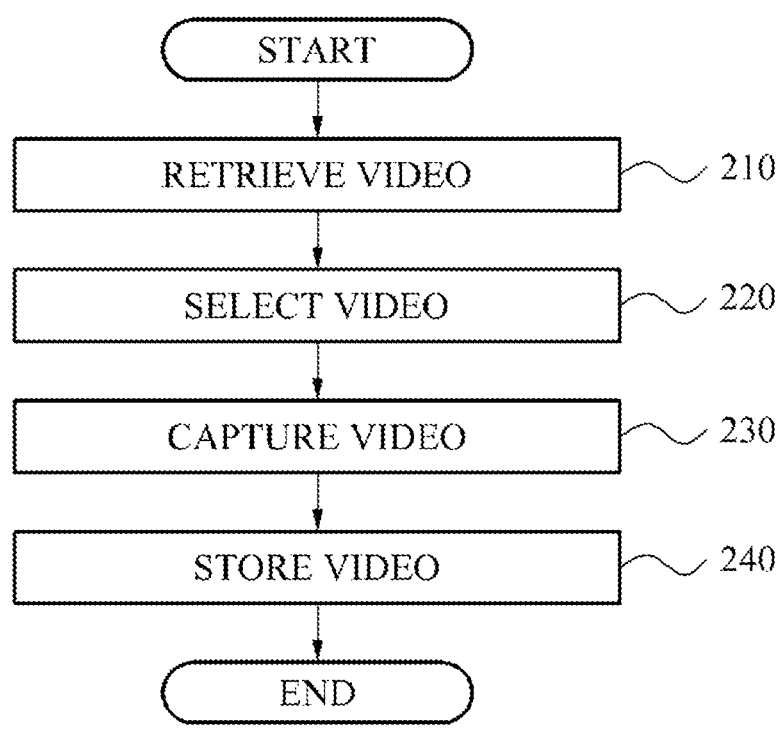
FIG. 2 is a flowchart illustrating a method of capturing a video according to exemplary embodiments of the present invention.

FIG. 2 is a flowchart illustrating a method of capturing a video according to exemplary embodiments of the present invention.

In video retrieval operation 210, a video on a website may be retrieved. In exemplary embodiments, a list of retrieved videos may be provided. A format of the video may include flash video (.flv), moving pictures experts group (MPEG)-4 (.mp4), Audio Video Interleaved (.avi), or the like.

In video selection operation 220, the video retrieved in video retrieval operation 210 may be selected based on a manipulation instruction received through a toolbar. In exemplary embodiments, the manipulation instruction through the toolbar may be an instruction to display a list of retrieved videos by clicking a button on the toolbar and to select at least one video from the list, or an instruction to select a video by clicking a button which appears when a mouse overlaps or hovers over a window displaying the video. The toolbar may provide a title, a format, and capacity of the video.

In video capture operation 230, the video selected in video selection operation 220 may be captured. The term "capture" includes a video extraction or a video grab. In exemplary embodiments, video capture may be performed on the PC when the captured video is to be stored on the PC. In exemplary embodiments, video capture may be performed on the cloud server when either the video being captured or the captured video is to be stored on the cloud server. A series of the above operations may be performed through the toolbar.

In a video storage operation 240, the video captured in video capture operation 230 may be stored. The video may be stored on one or more of the PC, the cloud server, and a mobile device depending on the needs of a user.

Figure 3:
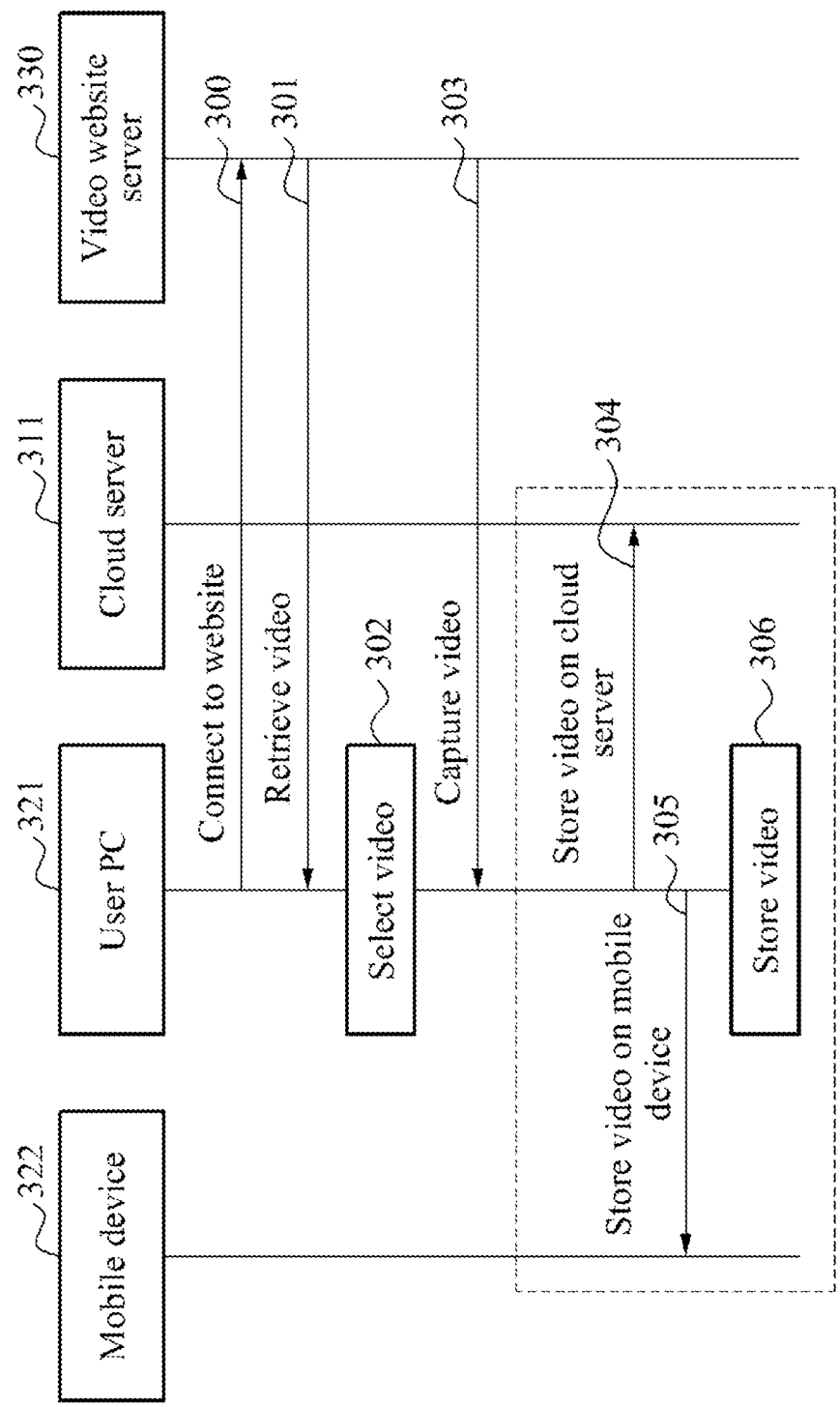
FIG. 3 illustrates a method of capturing and storing a video according to exemplary embodiments of the present invention.

FIG. 3 illustrates a method of capturing and storing a video according to exemplary embodiments of the present invention.

In website connection operation 300, a PC 321 may connect to a video website server 330.

A video retrieval operation 301, a video selection operation 302, and a video capture operation 303 may be as analogous to the video retrieval operation 210, the video selection operation 220, and the video capture operation 230 of FIG. 2, and repeated descriptions will be omitted here for conciseness and ease of description. In video capture operation 303, when a captured video is stored on a cloud server 331, the video may be captured on the cloud server 311 through a toolbar. In exemplary embodiments, a video retrieved from a website may be captured in a PC 321.

The captured video may be stored through various methods. In exemplary embodiments, the captured video may be stored on the cloud server 311 in operation 304 or stored on the PC 321 in operation 306. When a toolbar is installed on the PC 321 that is connected to a mobile device, for example, via a WI-FI network, the video may be stored on the mobile device 322 directly from the toolbar.

Figure 4:
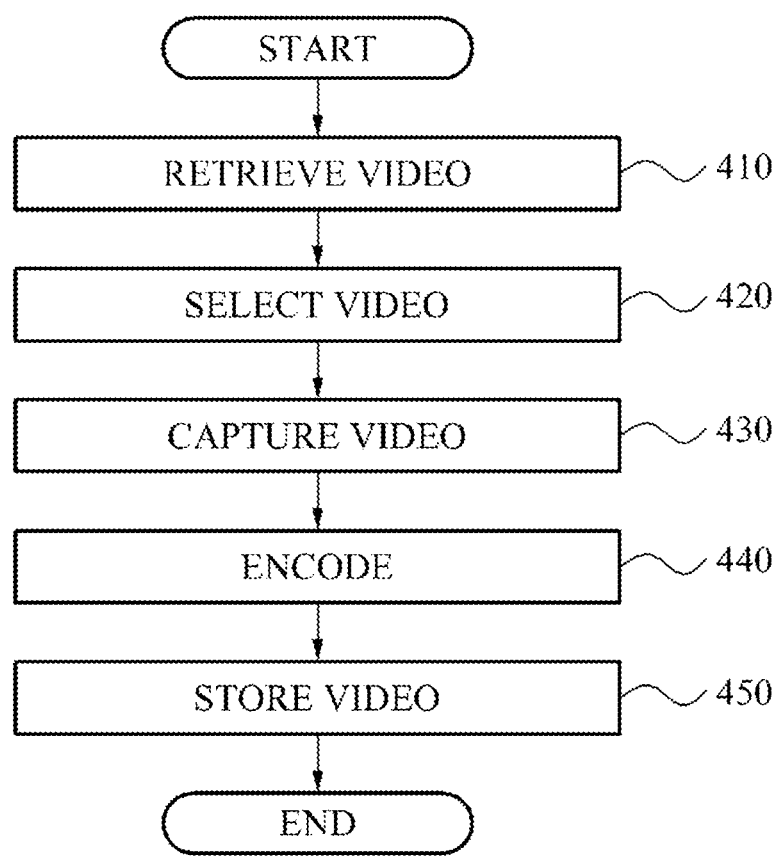
FIG. 4 is a flowchart illustrating a method of capturing and encoding a video according to exemplary embodiments of the present invention.

FIG. 4 is a flowchart illustrating a method of capturing and encoding a video according to exemplary embodiments of the present invention.

Video retrieval operation 410, video selection operation 420, video capture operation 430, and video storage operation 450 may be analogous to the video retrieval operation 210, the video selection operation 220, the video capture operation 230, and the video storage operation 240 described with reference to FIG. 2, and repeated descriptions will be omitted here for conciseness and ease of description.

In encoding operation 440, a video captured in video capture operation 430 may be encoded. Encoding may include a series of processes of editing or converting the video for an intended use or purpose. In exemplary embodiments, the video may be encoded in accordance with a resolution or an image quality selected based on a platform being run on a mobile device.

The encoding may be performed on a PC or a cloud server. On the cloud server, encoding may be performed in accordance with an encoding instruction transmitted from the PC.

Figure 5:
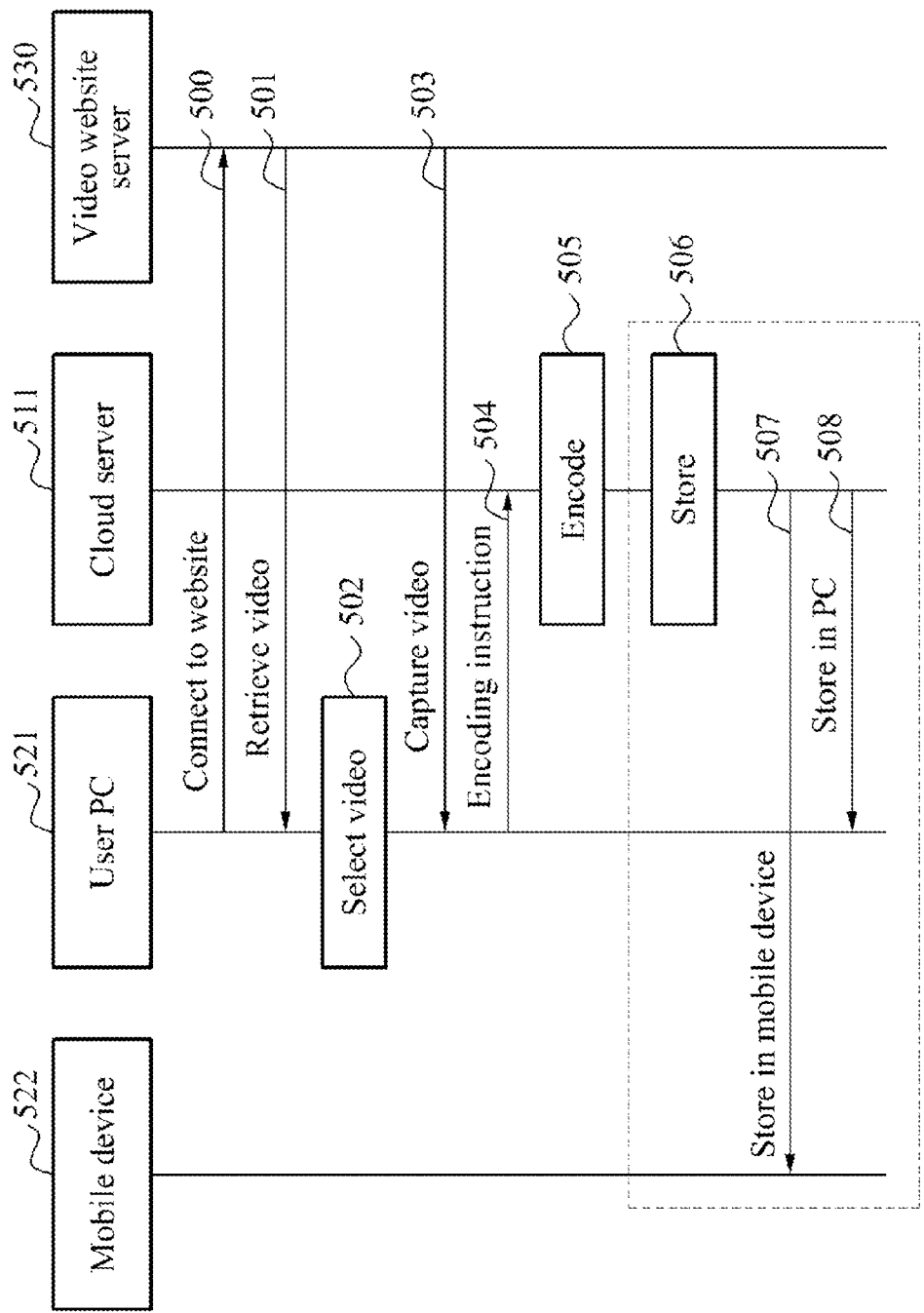
FIG. 5 illustrates a method of capturing and encoding a video according to exemplary embodiments of the present invention.

FIG. 5 illustrates a method of capturing and encoding a video according to exemplary embodiments of the present invention.

Website connection operation 500, video retrieval operation 501, video selection operation 502, and video capture operation 503 may be analogous to the website connection operation 300, video retrieval operation 301, video selection operation 302, and video capture operation 303 described with reference to FIG. 3, and repeated descriptions will be omitted here for conciseness and ease of description.

In encoding instruction operation 504, a PC 521 may determine settings related to encoding, such as, resolution and image quality, and transmit an encoding instruction to a cloud server 511.

In encoding operation 505, a captured video may be encoded based on the transmitted encoding instruction. In exemplary embodiments, the video may be captured from a video website server 530 via a PC 521, and then transmitted to the cloud server 511 and encoded. In exemplary embodiments, the video may be captured from the video website server 530 directly to the cloud server 511 and encoded.

The encoded video may be stored on the cloud server 511 in operation 506, stored on the PC 521 in operation 508, or stored directly on a mobile device 522 when the mobile device 522 is connected to the PC 521.

Figure 6:
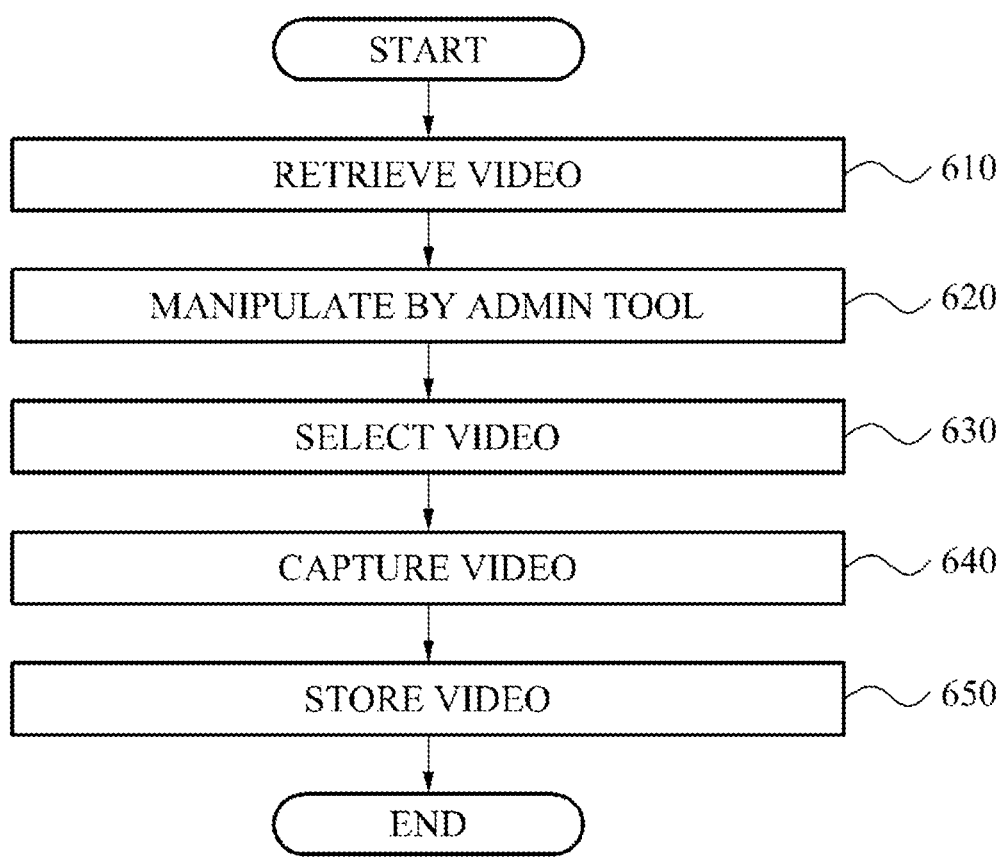
FIG. 6 is a flowchart illustrating a method of manipulating a toolbar using an Admin Tool according to exemplary embodiments of the present invention.

FIG. 6 is a flowchart illustrating a method of manipulating a toolbar using an Admin Tool according to exemplary embodiments of the present invention.

Video retrieval operation 610, video selection operation 620, video capture operation 630, and video storage operation 650 may be analogous to the video retrieval operation 210, video selection operation 220, video capture operation 230, and video storage operation 240 described with reference to FIG. 2, and thus repeated descriptions will be omitted here for conciseness and ease of description.

In manipulation operation 620, when specifications of a website or webpage are changed, for example, upon request from a person having a right to a video, a toolbar may be manipulated via Admin Tool. When specifications of the website are changed or upon request of the person having a right to the video, Admin Tool may renew or refresh the data stored in the toolbar, without an update of the toolbar being performed.

In exemplary embodiments, when Admin Tool renews or refreshes a prohibited video list that may be stored in the toolbar, a video included on the storage prohibited video list may not be displayed in a video list, thereby blocking retrieval of the video. The prohibited video list may identify a video restricted by a copyright holder of the video.

Figure 7:
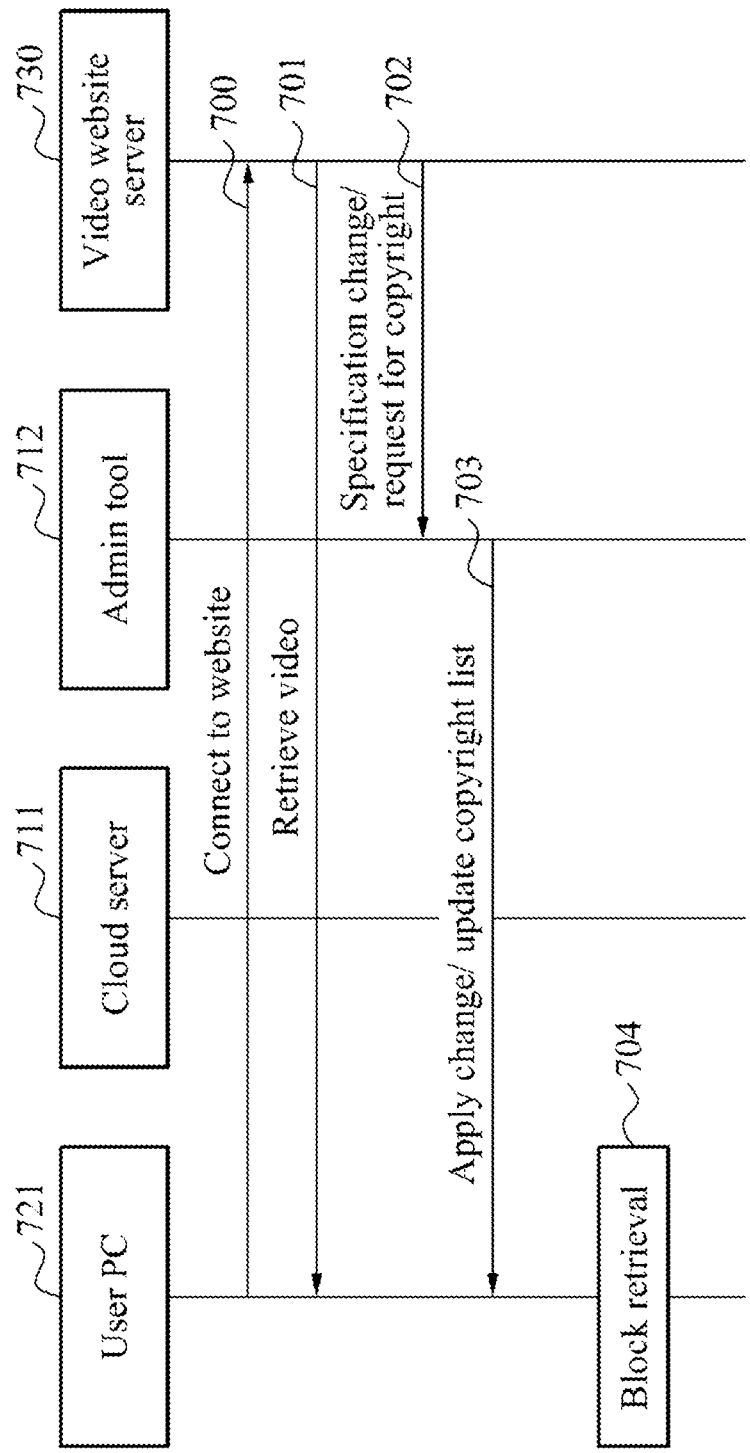
FIG. 7 illustrates a method of manipulating a toolbar through using an Admin Tool according to exemplary embodiments of the present invention.

FIG. 7 illustrates a method of manipulating a toolbar via an Admin Tool according to exemplary embodiments of the present invention.

Website connection operation 700 and video retrieval operation 701 may be analogous to the website connection operation 300 and the video retrieval operation 301 illustrated in FIG. 3, and thus repeated descriptions will be omitted here for conciseness and ease of description.

A change in specifications of a website or a request for a copyright may occur from a video website server 730 in operation 702. Admin Tool 712 may apply a changed specification of the website or renew a copyright list for a toolbar installed on a PC 721 in operation 703.

In retrieval block or cut-off operation 704, when a retrieved video on the website is in a prohibited video list, for example, when storage of the video violates a copyright, the video may be blocked or cut off from retrieval by not being displayed on a search result list. In exemplary embodiments, the blocked video may be removed from storage.

Figure 8:
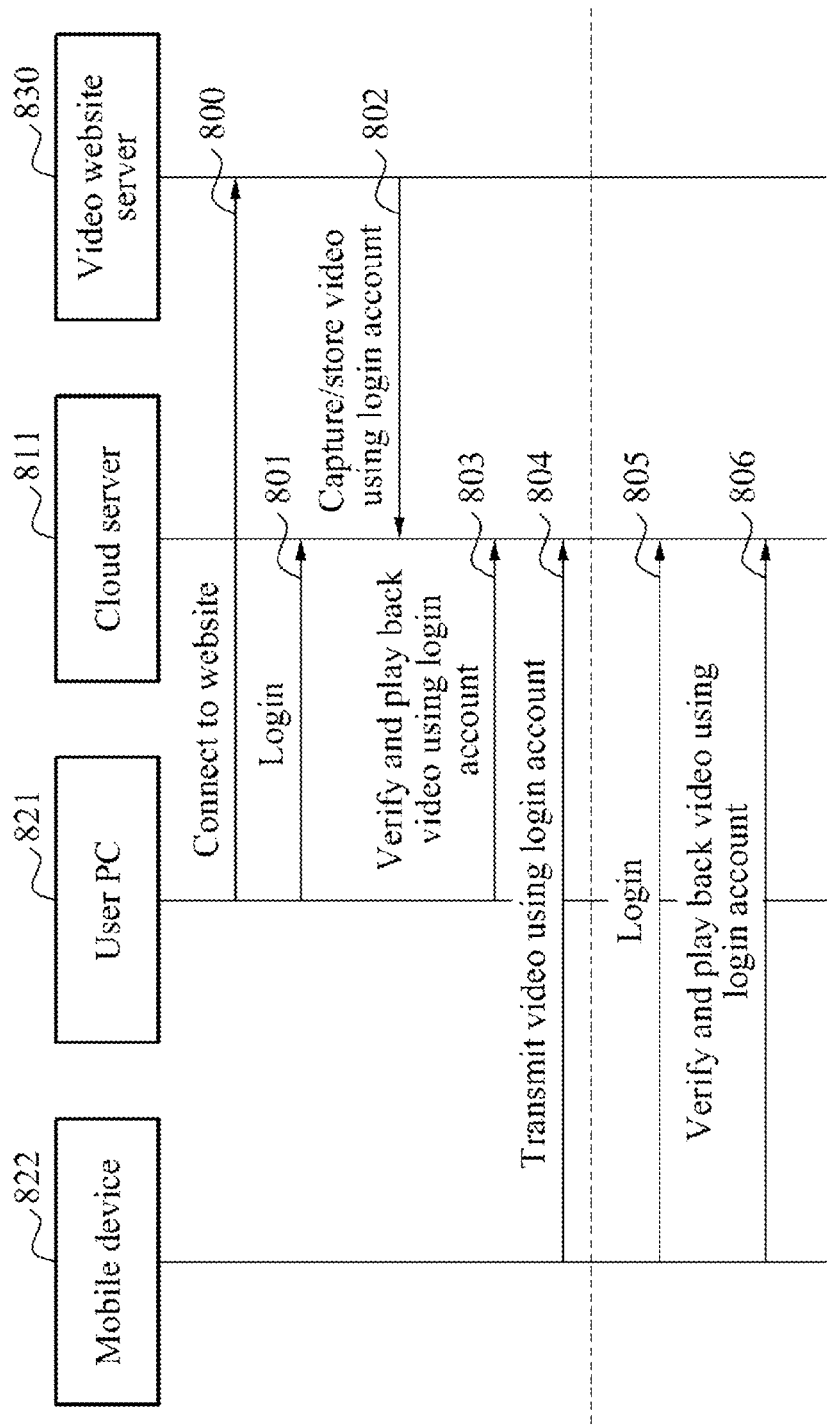
FIG. 8 illustrates a method of capturing and storing a video through logging in using an account created in advance according to exemplary embodiments of the present invention.

FIG. 8 illustrates a method of capturing and storing a video through logging in using an account created in advance according to exemplary embodiments of the present invention.

Website connection operation 800 may be analogous to website connection operation 300 illustrated in FIG. 3, and repeated descriptions will be omitted here for conciseness and ease of description.

In login operation 801, a PC 821 may login to a cloud server 811 through a toolbar using an account created in advance. When an account is not created in advance, the toolbar may display a window for creation of an account.

In video capture and storage operation 802 using the login account, in a login state to the cloud server 811, a video on a website may be captured and stored on the cloud server 811. As necessary, the video may be also subject to encoding.

In video verification and play back operation 803 using the login account, the PC 821 may log in to the cloud server 811 through the toolbar and verify or playback the video stored on the server.

In video transmission operation 804, using the login account identified when logging in through the toolbar, a video stored on a mobile device 822 connected to the PC 821 may be transmitted to the cloud server 811. The mobile device 822 may log in directly to the cloud server 811, not via the PC 821, in operation 805 and verify or play back the video using the login account in operation 806.

Figure 9:
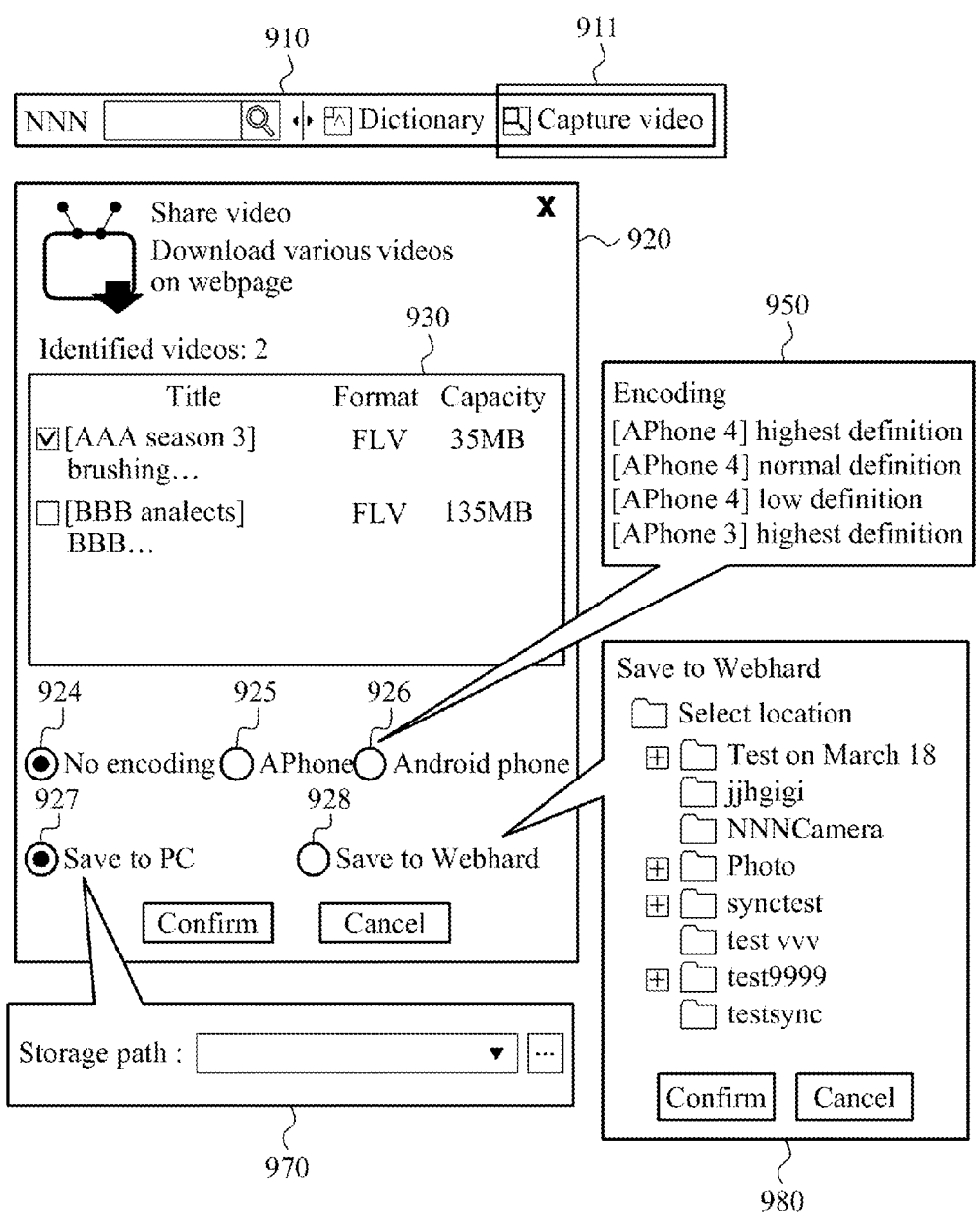
FIG. 9 illustrates a method of retrieving and selecting a video according to exemplary embodiments of the present invention.

FIG. 9 illustrates a method of retrieving and selecting a video according to exemplary embodiments of the present invention.

A toolbar 910 may include a search window and a button. In exemplary embodiments, when a first button 911, for example, a capture video button, displayed on the toolbar 910 is clicked, the toolbar 910 may implement, initiate or execute a method of capturing a video.

An exemplary video capture window 920 can be displayed by clicking the first button 911. The video capture window 920 may provide a video list 930 retrieved on a website and a menu for determining encoding settings 924, 925, 926, and storage modes 927 and 928.

The video list 930 may display a list of videos retrievable from a website. In exemplary embodiments, a plurality of videos to be captured may be selected by checking a related box.

A resolution for encoding may be selected. In exemplary embodiments, a resolution for encoding may be selected based on a platform, for example, no encoding setting 924, an iPhone encoding setting 925, and an Android phone encoding setting 926. In exemplary embodiments, when a resolution is determined for a particular platform, an image quality window 950 may be displayed. The image quality window 950 can indicate a desired image definition, for example, a highest or best definition, a normal definition, a low definition. The image quality window 950 can indicate a version of the platform that will playback the video, for example, "APhone 4," "APhone 3."

When a save to PC button 927 is selected, a window for designating a storage path 970 may be displayed. When a mode of storage in a cloud server, such as, a save to the cloud or "webhard" button 928 is selected, a window 980 for designating a storage location on the cloud server may be further displayed.

Figure 10:
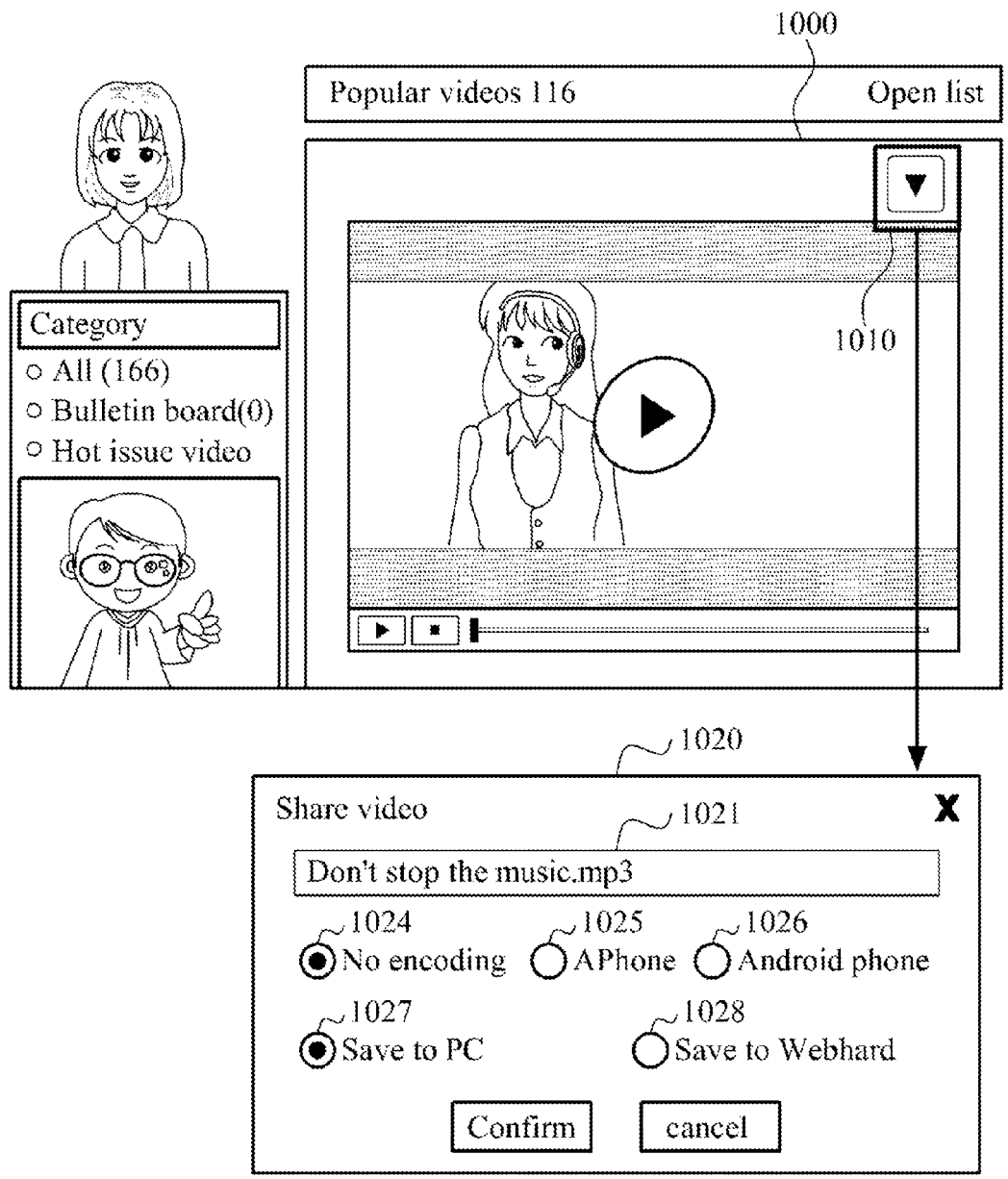
FIG. 10 illustrates a method of retrieving and selecting a video according to exemplary embodiments of the present invention.

FIG. 10 illustrates a method of retrieving and selecting a video according to exemplary embodiments of the present invention.

A website 1000 may include a video. A button 1010 may be displayed on a PC with a toolbar installed. The button 1010 may be displayed when a mouse is placed over the video to be captured. When the video to be captured is selected by clicking the button 1010, a video capture window 1020 may be displayed.

The video capture window 1020 may include a title bar 1021 and buttons for selecting encoding settings 1024, 1025, 1026, and storage modes 1027 and 1028. Exemplary encoding settings 1024, 1025, 1026, and the storage modes 1027 and 1028 may be analogous to the encoding settings 924, 925, 926, and storage modes 927 and 928 illustrated in FIG. 9, and repeated descriptions will be omitted for conciseness and ease of description.

Figure 11:
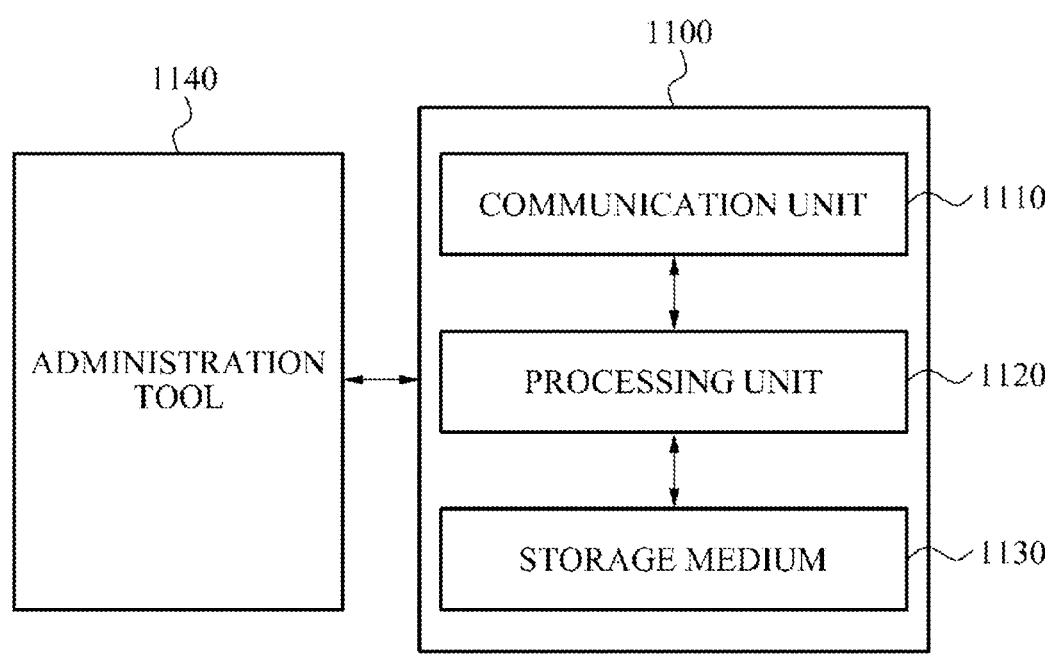
FIG. 11 is a block diagram illustrating a detailed configuration of a cloud server capturing a video using a toolbar according to exemplary embodiments of the present invention.

FIG. 11 is a block diagram illustrating a detailed configuration of a cloud server capturing a video using a toolbar according to exemplary embodiments of the present invention. A cloud server 1100 may include a communication unit 1110, a processing unit 1120, a storage medium 1130, and an Admin Tool 1140.

The communication unit 1110 may include any device capable of receiving and transmitting encoding instructions or captured videos from a video website server, a mobile device, and a PC.

The processing unit 1120 includes a device for processing operations in accordance with programs stored on the storage medium 1130 and may include a central processing unit (CPU) and a microprocessor.

The storage medium 1130 may store a program in a non-transient media. The program can include instructions to enable the processing unit 120 to perform: an authentication process based on a request for logging in using an account, a process of capturing at least one video from a website, a process of receiving an encoding instruction on the video, a process of encoding the video based on the encoding instruction, a process of storing the video, and the like. The storage medium 1130 may include, for example, a hard disk, a solid state disk (SSD), and any hardware capable of storing programs.

Figure 12:
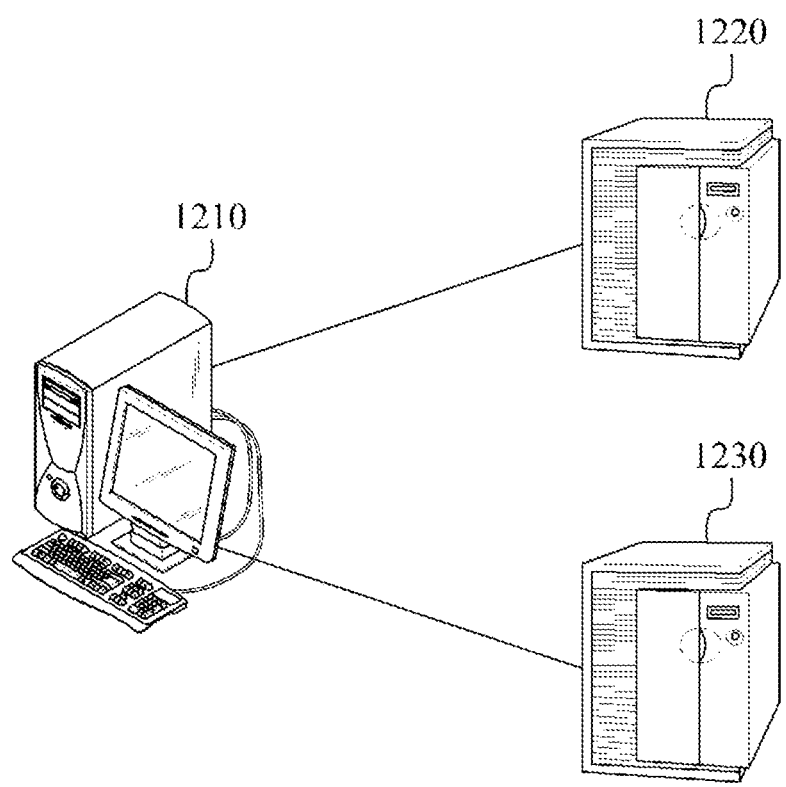
FIG. 12 illustrates relationships between an electronic device with a toolbar installed, an object management server, and a website server according to exemplary embodiments of the present invention.

FIG. 12 illustrates relationships between an electronic device with a toolbar installed, an object management, and a website server according to exemplary embodiments of the present invention.

An electronic device 1210 allows a toolbar to be installed and may include a desktop computer, a laptop computer, and any device capable of uploading an object on a webpage through the toolbar. When a user selected object on a webpage is transferred to an upload area, the electronic device 1210 with the toolbar installed may upload and store the selected object and information about the object, also referred to as object information, in an object management server 1220 after successful authentication.

The object management server 1220 includes a server capable of communicating with the electronic device 1210 and may store the object on the webpage and the uploaded object information. The object management server 1220 may: receive a request for logging in to the account created in advance through the toolbar, authenticate the request for logging in, and store the uploaded object transferred to the upload area and the object information through the toolbar after authentication. In exemplary embodiments, the object management server 1220 may receive requests for verification and processing of the object and the object information stored from the electronic device 1210 and perform an operation based on the requests.

A website server 1230 hosts a webpage being connected to the by electronic device through a web browser, and a user may connect to the website by inputting a domain address of the server. Here, the domain address may be a Universal Resource Locator (URL), such as, a domain name or an Internet Protocol (IP) address.

An exemplary embodiment of the present invention discloses a server to distribute a toolbar for capturing a video, the server including: a communication unit configured to distribute the toolbar stored in a storage medium and the storage medium configured to store the toolbar including instructions to enable a computer on which the distributed toolbar is installed to perform operations, wherein the operations include retrieving at least one video from a website through the toolbar, selecting at least one of the videos based on a manipulation instruction through the toolbar, capturing the selected video, and storing the video in a cloud or a mobile device.

Figure 13:
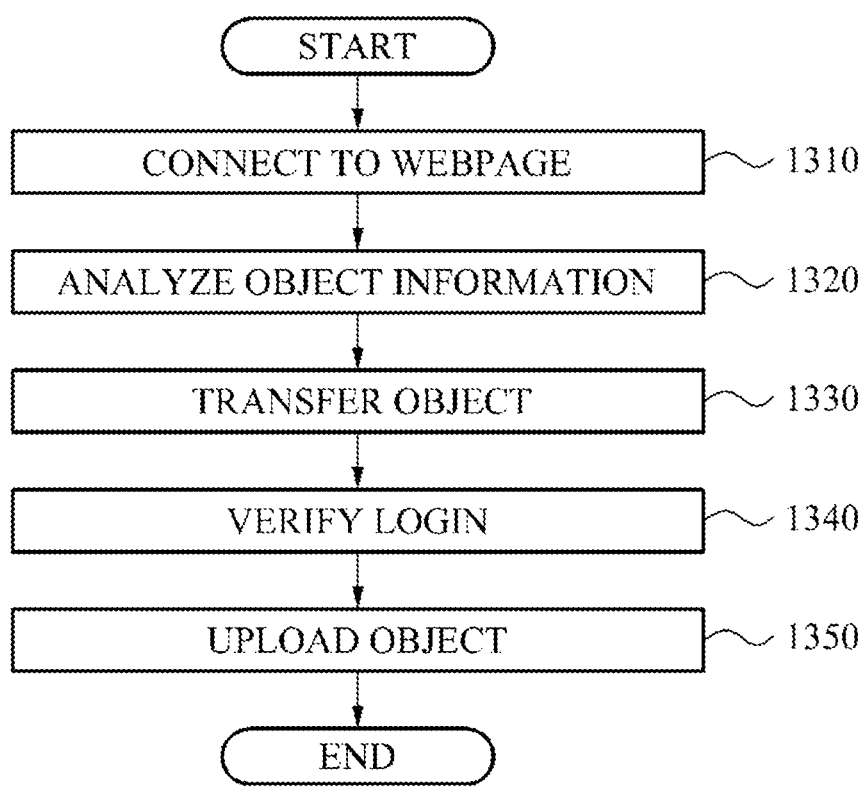
FIG. 13 is a flowchart illustrating a method of uploading an object on a webpage through a toolbar according to exemplary embodiments of the present invention.

FIG. 13 is a flowchart illustrating a method of uploading an object on a webpage through a toolbar according to exemplary embodiments of the present invention.

In operation 1310, connection to a webpage may be carried out through a web browser. The web browser, a program for accessing web services, for example, World Wide Web (WWW) services, may include any program for receiving and presenting hypertext described in HyperText Mark-up Language (HTML). Exemplary web browsers include MICROSOFT EXPLORER, GOOGLE CHROME, and MOZILLA FIREFOX.

In operation 1320, object information about an object on a webpage may be analyzed through the toolbar. The object may include an image, a video, a sound source file, a file, and the like attached to the webpage. The image may include object information in a standard format, such as, Joint Photographic Experts Group (.JPG), Graphics Interchange Format (.GIF), Portable Graphics Network (.PNG), or the like. The video may include object information in a standard format, such as, FLV, Small Web Format (SWF), AVI, or the like. The sound source file may include object information in a format, such as, MP3, waveform audio file format (WAV), or the like.

In exemplary embodiments, at least one object may be detected on the webpage through the toolbar. In this instance, at least one object may be detected through a script or a source code of the webpage.

In operation 1330, the object may be selected and transferred to an upload area through the toolbar. In exemplary embodiments, the object is selected by pointing and transferred to the upload area by performing a drag and drop operation.

In exemplary embodiments, pointing may include clicking a mouse, a finger touch of a user, or any gesture indicating or selecting an object, while drag and drop may be a gesture in which the user drags an object being pointed to a particular location and drops the object by lifting pointing.

In operation 1340, whether logging in to an object management server through the toolbar is enabled may be verified. When logging in is not enabled, the object management server may receive a request for logging in to the account and determine whether a user requesting the service is an appropriate user.

In operation 1350, the object transferred to the upload area along with object information about the object may be uploaded to the object management server through the toolbar. In exemplary embodiments, when the object is transferred to the upload area without any identification process, the object and the object information may be uploaded automatically. In exemplary embodiments, a process of verifying whether to upload the object and the object information based on a configuration of the toolbar set up by the user may be added.

An exemplary embodiment of the present invention discloses an object management server for uploading an object on a webpage through a toolbar, the object management server including: a communication unit, a processing unit, and a computer storage medium including instructions to enable the processing unit to perform operations when the instructions are executed by the processing unit, wherein the operations include verifying whether logging in to an account created in advance is enabled through the toolbar, receiving an upload of the object transferred to an upload area and object information about the object through the toolbar when logging in is enabled, and storing the object and the object information.

Figure 14:
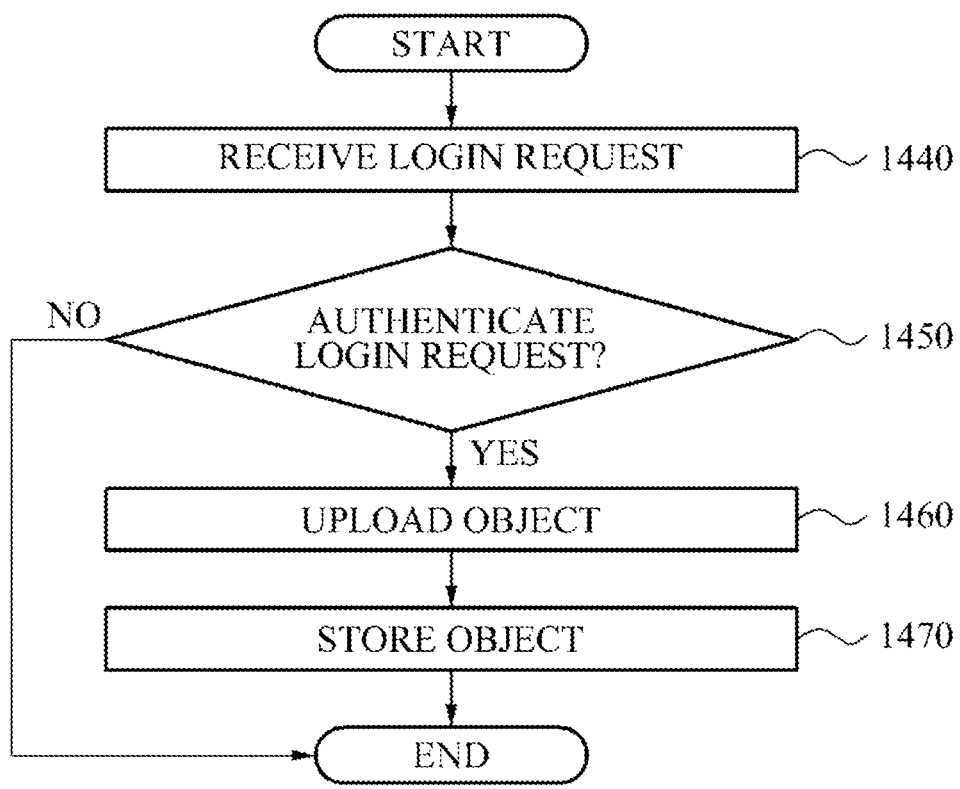
FIG. 14 is a flowchart illustrating a method of uploading an object on a webpage through a toolbar according to exemplary embodiments of the present invention.

FIG. 14 is a flowchart illustrating a method of uploading an object on a webpage through a toolbar according to exemplary embodiments of the present invention.

In operation 1440, when an electronic device does not log in, an object management server may receive a request for logging in to an account created in advance through a toolbar from the electronic device.

In operation 1450, the request for logging in may be authenticated. Here, when an identification (ID) and a password used in the request for logging in corresponds to an ID and a password of a user account stored on the server, the ID and the password may be authenticated as an appropriate user. In exemplary embodiments, when an account is not created in advance by the user, a window for a membership application may be displayed on the electronic device.

In operation 1460, when the request for logging in is authenticated, the object management server may receive an upload of an object transferred to an upload area and object information about the object through the toolbar.

In operation 1470, the object and the object information uploaded may be stored. The object and the object information may be stored in a storage medium of the object management server to be assigned to the account logged in to by the electronic device.

Figure 15:
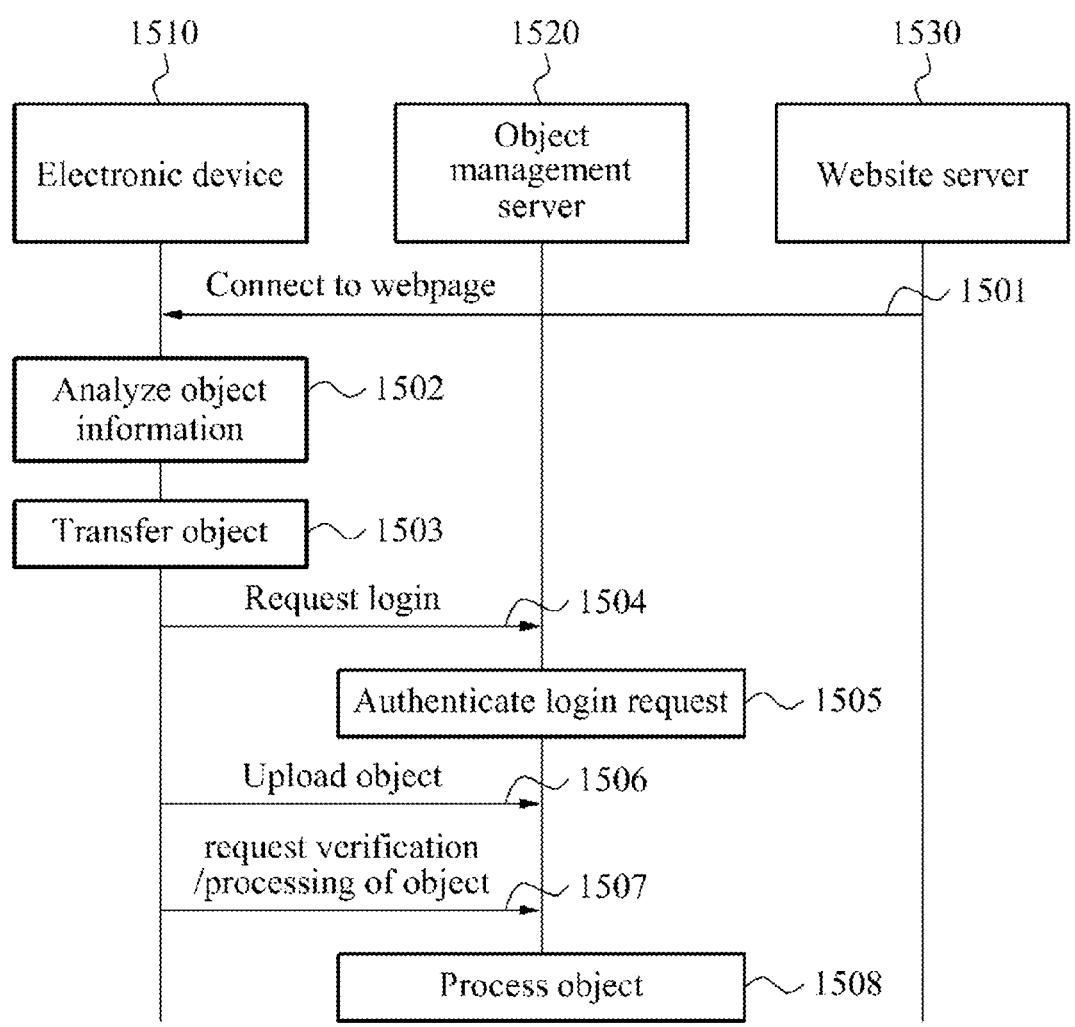
FIG. 15 is a flowchart illustrating a method of uploading an object on a webpage through a toolbar according to exemplary embodiments of the present invention.

FIG. 15 is a flowchart illustrating a method of uploading an object on a webpage through a toolbar according to exemplary embodiments of the present invention. Operations 1501, 1502, 1503, 1504 and 1506 performed in an electronic device 1510 may be analogous to operations 1310, 1320, 1330, 1340 and 1360 illustrated in FIG. 13, while operation 1505 performed in an object management server 1520 may be analogous to operation 1450 illustrated in FIG. 14, and repeated descriptions will be omitted here for conciseness and ease of description.

In operation 1507, when logging in is enabled, the electronic device 1510 may connect to the object management server 1520 and make a request for identification or processing of an object stored.

In operation 1508, when the object management server 1520 receives a request for identification of the object, the object management server 1520 may transmit the object and object information stored on the server to the electronic device 1510 using a login account. Also, when the object management server 1520 receives a request for processing of the object, the object management server 1520 may perform an appropriate operation. In exemplary embodiments, a process of processing the object may include: a process of storing the object in a separate medium, a process of editing and encoding the object in the object management server, and a process of altering the object.

Figure 16:
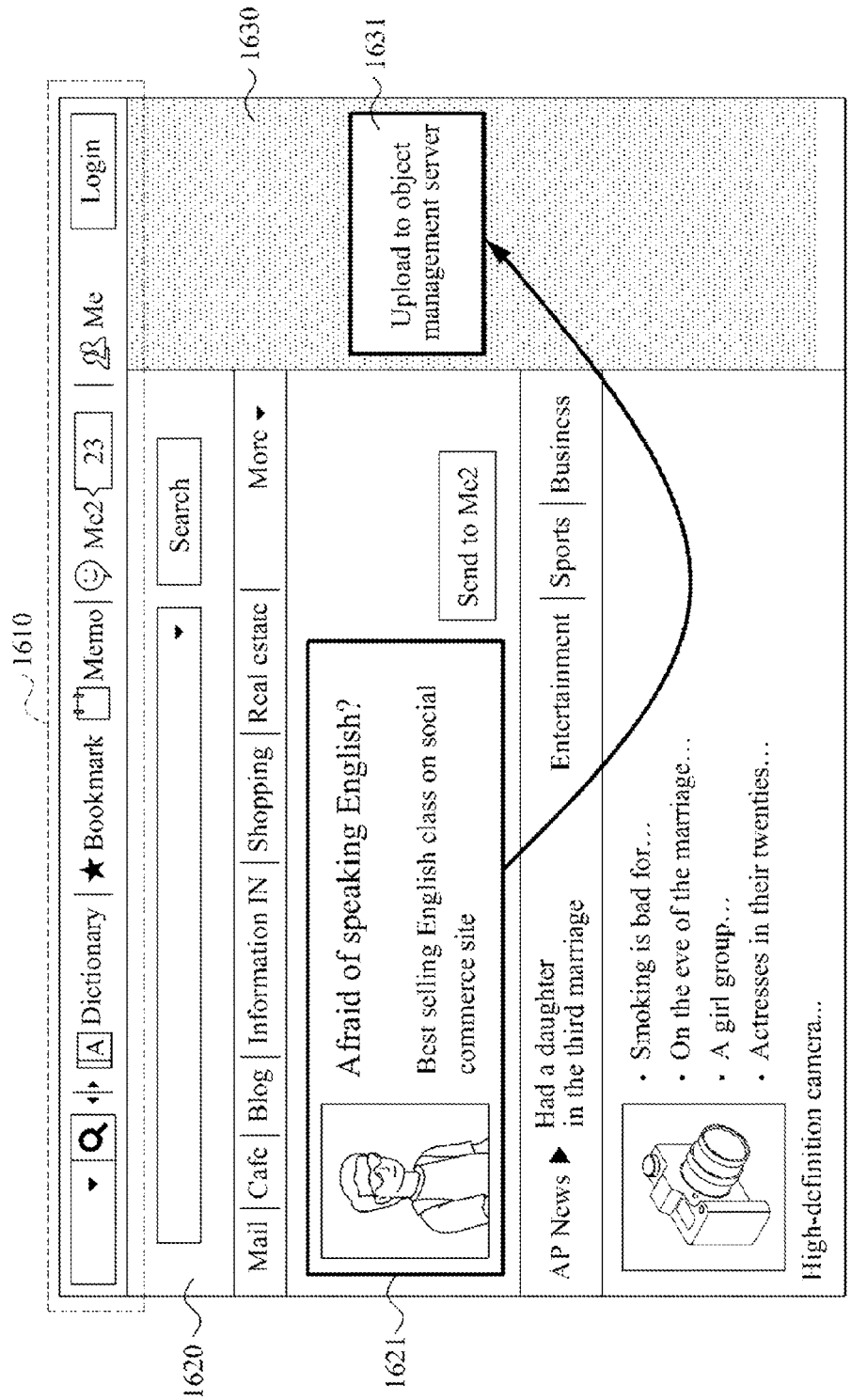
FIG. 16 illustrates a method of uploading an object on a webpage through a toolbar according to exemplary embodiments of the present invention.

FIG. 16 illustrates a method of uploading an object 1621 on a webpage 1620 through a toolbar 1610 according to exemplary embodiments of the present invention. As the object 1621 is uploaded by transferring the object 1621 to an upload area 1630, the upload area 1630 may be generated when the object on the webpage is transferred. The upload area 1630 may be generated when the object is selected by pointing.

In exemplary embodiments, the object 1621 includes an image on the webpage 1620. The object 1621 may be generated when the upload area 1630 overlaps a right region of the webpage when the object is dragged by the user. Here, when the dragged object is dropped onto the upload area, the object may be uploaded to the object management server.

Thus, identification of whether the object is uploaded by clicking an upload to object management server button 1631 can be performed based on a configuration set by the user, thereby minimizing manipulation mistakes on the part of the user. When an account is not created in advance in the object management server, a window for a membership application may be further displayed.

Figure 17:
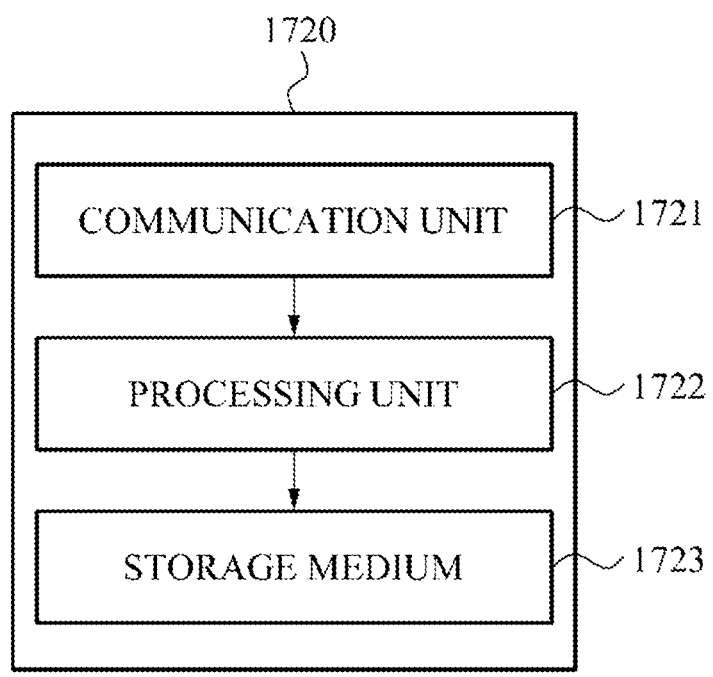
FIG. 17 is a block diagram illustrating a configuration of an object management server according to exemplary embodiments of the present invention.

FIG. 17 is a block diagram illustrating a detailed configuration of an object management server according to exemplary embodiments of the present invention. An object management server 1720 may include a communication unit 1721, a processing unit 1722, and a storage medium 1723.

The communication unit 1721 may include any device capable of: receiving a request for logging in, receiving a request for identification of an object, receiving a request for processing of the object from an electronic device, and performing a process needed for uploading the object through a toolbar.

The processing unit 1722 includes a device for processing operations in accordance with programs stored on the storage medium 1723 and may include a CPU and a microprocessor. In exemplary embodiments, the processing unit 1722 may perform an authentication process of an account created in advance based on the request for logging in received from the electronic device or a processing process based on the request for processing of the object.

The storage medium 1723 includes a computer storage medium including instructions to enable the processing unit 1722 to perform operations when the instructions are executed by the processing unit 1722. Such operations may include: a process of receiving a request for logging in to the account created in advance through the toolbar, a process of authenticating the request for logging in, a process of receiving an upload of the object transferred to an upload area and object information about the object through the toolbar when the request for logging in is authenticated, and a process of storing the object and the object information. Further, the storage medium 1723 may store the object and the object information received from the electronic device in the login account. Here, the storage medium 1723 may include, for example, a hard disk, a solid state drive (SSD), and any hardware capable of storing programs.

Figure 18:
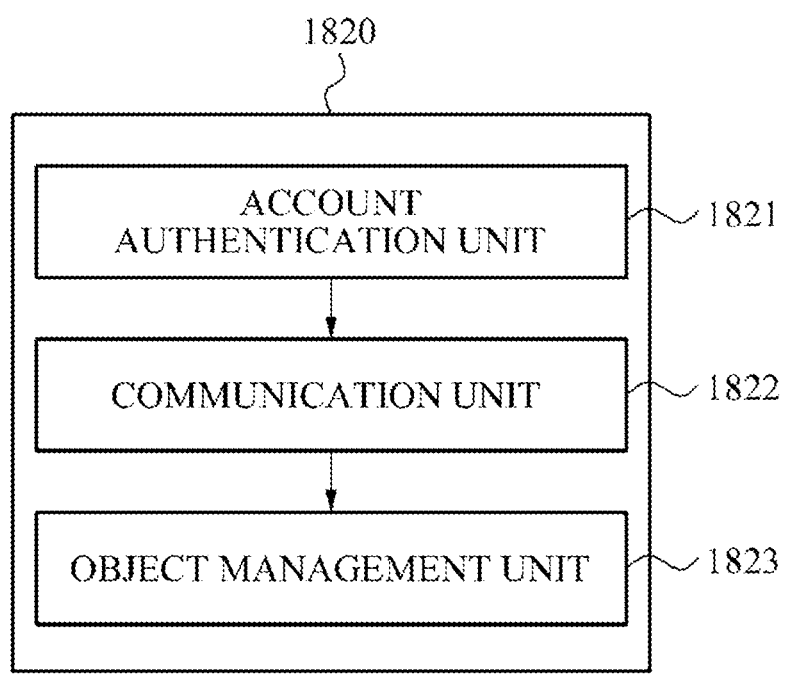
FIG. 18 is a block diagram illustrating a detailed configuration of an object management server according to exemplary embodiments of the present invention.

FIG. 18 is a block diagram illustrating a detailed configuration of an object management server according to exemplary embodiments of the present invention. The object management server 1820 may include an account authentication unit 1821, a communication unit 1822, and an object management unit 1823.

The account authentication unit 1821 may perform an authentication process to determine an appropriate user based on a request for logging in to an account created in advance from an electronic device. When an account is not created in advance, a window for a membership application may be displayed on the electronic device with a toolbar installed.

The communication unit 1822 may communicate with the electronic device, similarly to the communication unit 1721 of FIG. 17, and provide an object, object information, and any information used to upload the object through the toolbar to the account authentication unit 1821 and the object management unit 1823, as necessary.

The object management unit 1823 may store the object and the object information from the communication unit 1822 by an account logged in to by the electronic device, thereby providing an integrated object management solution for each account.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

While the present invention has been shown and described with reference to a few exemplary embodiments and the accompanying drawings, it will be apparent to those skilled in the art that various modifications and variations can be made in the present invention without departing from the spirit or scope of the invention. For example, adequate effects of the present invention may be achieved even if the foregoing processes and methods may be carried out in different order than described above, and/or the aforementioned elements, such as systems, structures, devices, or circuits, may be combined or coupled in different forms and modes than as described above or be substituted or switched with other components or equivalents.

Thus, it is intended that the present invention cover the modifications and variations of this invention provided they come within the scope of the appended claims and their equivalents.

What is claimed is:

1. A computer-implemented method of capturing a video using a toolbar installed on a local computer under a control of a local user, the method comprising:
    retrieving, with the local computer under the control of the local user, a video from a website server;
    manipulating the toolbar from a remote computer to prohibit the local user from selecting the retrieved video at the local computer when the retrieved video is determined by the website server to be a prohibited video;
    selecting, with the toolbar, the retrieved video at the local computer based on a manipulation instruction applied to the toolbar from the remote computer when the retrieved video at the local computer is not determined to be a prohibited video by the website server;
    capturing the selected video from the website;
    transmitting the captured video to a cloud server in communication with the local computer;
    determining, with the local computer after the captured video has been transmitted to the cloud server, a resolution and an image quality of the captured video based on a platform selected by a user through the toolbar;
    transmitting, from the local computer to the cloud server, an encoding instruction of the selected video based on the determined resolution and image quality;
    encoding the captured video at the cloud server based on the encoding instruction received from the local computer; and
    storing, the encoded video from the cloud server on a mobile device, the local computer or the cloud server.

2. The method of claim 1, further comprising receiving, with the local computer, an encoding selection for the video through the toolbar,
    wherein the capturing of the selected video comprises capturing the selected video per the encoding selection.

3. The method of claim 1, wherein the transmitting the encoding instruction to the cloud servers through the toolbar.

4. The method of claim 1, wherein the storing of the video comprises storing the video on the cloud server by logging in through the toolbar to the cloud server using an account.

5. The method of claim 4, further comprising verifying or playing back the video by logging in to the cloud server sing the account.

6. The method of claim 1, wherein the encoded video is stored on the mobile device through the local computer.

7. The method of claim 6, further comprising logging in to the cloud server using an account; and
    transmitting the encoded video from the mobile device to the cloud server.

8. The method of claim 1, wherein the manipulating the toolbar by the remote computer comprises renewing a prohibited video list stored in the toolbar by the remote computer, and blocking, with the local computer, the selection of the video from the website server when the video is included on the prohibited video list.

9. A cloud server for capturing a video from a website server selected by a local computer under a control of a local user and in communication with the cloud server and having a toolbar for retrieving and selecting the video, the cloud server comprising:

a communication unit to establish communication between the server and the local computer and between the server and the website server;

a remote computer configured to manipulate the toolbar on the local computer to prohibit the local user from selecting a video at the local computer when the video is determined by the website server to be a prohibited video;

a processor; and a computer storage medium comprising instructions to enable the processor to perform operations when the instructions are executed by the processor, wherein the operations comprise:

performing authentication based on a request for logging in to an account on the cloud server from the local computer;

capturing a video from website server based on a manipulation instruction applied, through the toolbar installed on the local computer;

receiving, from the local computer, an encoding instruction for the captured video based on a resolution and an image quality determined based on a platform selected by the local user through the toolbar, the resolution and the image quality being determined with the local computer after the captured video has been received by the cloud server;

encoding the captured video at the cloud server based on the encoding instruction received from the local computer; and storing the encoded video at the cloud server.

* * * * *